United States Patent
Vange et al.

(10) Patent No.: US 7,043,563 B2
(45) Date of Patent: May 9, 2006

(54) METHOD AND SYSTEM FOR REDIRECTION TO ARBITRARY FRONT-ENDS IN A COMMUNICATION SYSTEM

(75) Inventors: Mark Vange, Toronto (CA); Glenn Sydney Wilson, Toronto (CA); Michael Kouts, Toronto (CA); Marc Plumb, Toronto (CA); Alexandr Chekhovtsov, Brampton (CA)

(73) Assignee: Circadence Corporation, Boulder, CO (US)

( * ) Notice: Subject to any disclaimer, the term of this patent is extended or adjusted under 35 U.S.C. 154(b) by 694 days.

(21) Appl. No.: 09/835,870

(22) Filed: Apr. 16, 2001

(65) Prior Publication Data

US 2002/0002622 A1 Jan. 3, 2002

Related U.S. Application Data

(60) Provisional application No. 60/197,490, filed on Apr. 17, 2000.

(51) Int. Cl.
*G06F 15/16* (2006.01)
(52) U.S. Cl. ............... 709/245; 709/219; 709/232; 709/226; 718/105
(58) Field of Classification Search ........ 709/225–226, 709/219, 232, 245; 718/105
See application file for complete search history.

(56) References Cited

U.S. PATENT DOCUMENTS

| | | | |
|---|---|---|---|
| 5,258,983 A | 11/1993 | Lane et al. | |
| 5,673,322 A | 9/1997 | Pepe et al. | |
| 5,757,771 A | 5/1998 | Li et al. | |
| 5,933,412 A | 8/1999 | Choudhury et al. | |
| 5,951,694 A | 9/1999 | Choquier et al. | |
| 5,999,971 A | 12/1999 | Buckland | |
| 6,006,264 A * | 12/1999 | Colby et al. | 709/226 |
| 6,023,456 A | 2/2000 | Chapman et al. | |
| 6,034,964 A | 3/2000 | Fukushima et al. | |
| 6,167,449 A | 12/2000 | Arnold et al. | |
| 6,415,323 B1 * | 7/2002 | McCanne et al. | 709/225 |
| 6,523,022 B1 * | 2/2003 | Hobbs | 707/3 |
| 6,578,066 B1 * | 6/2003 | Logan et al. | 718/105 |
| 6,598,077 B1 * | 7/2003 | Primak et al. | 709/219 |
| 6,779,119 B1 * | 8/2004 | Moshfeghi et al. | 726/23 |
| 6,799,214 B1 * | 9/2004 | Li | 709/226 |

(Continued)

FOREIGN PATENT DOCUMENTS

EP 0384339 A2 8/1990

(Continued)

OTHER PUBLICATIONS

K. Sriram, "Methodologies for bandwidth allocation, transmission scheduling, and congestion avoidance in broadband ATM networks", Computer Networks and ISDN Systems, 26 (1993) pp. 43-59.

(Continued)

*Primary Examiner*—Wen-Tai Lin
(74) *Attorney, Agent, or Firm*—Stuart T. Langley; Kent A. Lembke; Hogan & Hartson L.L.P.

(57) ABSTRACT

A system and method for providing network resources from an origin server to a client. A set of intermediary servers is topologically dispersed throughout a network. An enhanced communication channel is provided between the set of intermediary servers and the origin server. A redirector receives address resolution requests for the origin server, selects one of the intermediary servers in response to the request, and provides a network address of the selected intermediary servers to an entity generating the address resolution request.

16 Claims, 7 Drawing Sheets

U.S. PATENT DOCUMENTS

2001/0049741 A1* 12/2001 Skene et al. ................. 709/232
2003/0154279 A1* 8/2003 Aziz ........................... 709/225
2005/0010653 A1* 1/2005 McCanne ................... 709/219

FOREIGN PATENT DOCUMENTS

| EP | 0794491 A2 | 9/1997 |
| EP | 0828214 A2 | 3/1998 |
| EP | 0942363 A2 | 9/1999 |
| GB | 2309558 | 7/1997 |
| WO | WO 97/29424 | 8/1997 |
| WO | WO 97/30392 | 8/1997 |
| WO | WO 98/26553 | 6/1998 |
| WO | WO 98/28938 | 7/1998 |
| WO | WO 99/09689 | 2/1999 |
| WO | WO 99/18534 | 4/1999 |
| WO | WO 99/57620 | 11/1999 |
| WO | WO 99/57637 | 11/1999 |

OTHER PUBLICATIONS

V. P. Kumar, et al., "Beyond Best Effort: Router Architectures for the Differentiated Services of Tomorrow's Internet", May 1998, IEEE Communications Magazine, pp. 152-164.

R. M. Adler, "Distributed Coordination Models for Client/Server Computing", Apr. 1995, IEEE Computer, pp. 14-22.

G.-C. Lai, et al., "Support QoS in IP over ATM", Computer Communications, 22 (1999) pp. 411-418.

* cited by examiner

METHOD AND SYSTEM FOR REDIRECTION TO ARBITRARY FRONT-ENDS IN A COMMUNICATION SYSTEM

RELATED APPLICATIONS

The present invention claims priority from U.S. Provisional Patent Application No. 60/197,490 entitled CONDUCTOR GATEWAY filed on Apr. 17, 2000.

BACKGROUND OF THE INVENTION

1. Field of the Invention

The present invention relates, in general, to network information access and, more particularly, to software, systems and methods for serving web pages in a coordinated fashion from multiple cooperating web servers.

2. Relevant Background

Increasingly, business data processing systems, entertainment systems, and personal communications systems are implemented by computers across networks that are interconnected by Internetworks (e.g., the Internet). The Internet is rapidly emerging as the preferred system for distributing and exchanging data. Data exchanges support applications including electronic commerce (e-commerce), broadcast and multicast messaging, videoconferencing, gaming, and the like.

The Internet is a collection of disparate computers and networks coupled together by a web of interconnections using standardized communications protocols. The Internet is characterized by its vast reach as a result of its wide and increasing availability and easy access protocols. Unfortunately, the ubiquitous nature of the Internet results in variable bandwidth and quality of service between points. The latency and reliability of data transport is largely determined by the total amount of traffic on the Internet and so varies wildly seasonally and throughout the day. Other factors that affect quality of service include equipment outages and line degradation that force packets to be rerouted, damaged and/or dropped. Also, routing software and hardware limitations within the Internet infrastructure may create bandwidth bottlenecks even when the mechanisms are operating within specifications.

Internet transport protocols do not discriminate between users. Data packets are passed between routers and switches that make up the Internet fabric based on the hardware's instantaneous view of the best path between source and destination nodes specified in the packet. Because each packet may take a different path, the latency of a packet cannot be guaranteed and, in practice, varies significantly. Likewise, data packets are routed through the Internet without any prioritization based on content.

Prioritization has not been an issue with conventional networks such as local area networks (LANs) and wide area networks (WANs) because the average latency of such networks has been sufficiently low and sufficiently uniform to provide acceptable performance. However, there is an increasing demand for network applications that cannot tolerate high and variable latency. This situation is complicated when the application is to be run over the Internet where latency and variability in latency are many times greater than in LAN and WAN environments.

A particular need exists in environments that involve multiple users accessing a network resource such as a web server. Examples include broadcast, multicast and videoconferencing as well as most electronic commerce (e-commerce) applications. In these applications, it is important to maintain a reliable connection so that the server and clients remain synchronized and information is not lost.

In e-commerce applications, it is important to provide a satisfying buyer experience that leads to a purchase transaction. To provide this high level of service, a web site operator must ensure that data is delivered to the customer in the most usable and efficient fashion. Also, the web site operator must ensure that critical data received from the customer is handled with priority.

Until now, however, the e-commerce site owner has had little or no control over the transport mechanisms through the Internet that affect the latency and quality of service. This is akin to a retailer being forced to deal with a customer by shouting across the street, never certain how often what was said must be repeated, and knowing that during rush hour communication would be nearly impossible. While efforts are continually being made to increase the capacity and quality of service afforded by the Internet, it is contemplated that congestion will always impact the ability to predictably and reliably offer a specified level of service. Moreover, the change in the demand for bandwidth increases at a greater rate than does the change in bandwidth supply, ensuring that congestion will continue to be an issue into the foreseeable future. A need exists for a system to exchange data over the Internet that provides a high quality of service even during periods of congestion.

Many e-commerce transactions are abandoned by the user because system performance degradations frustrate the purchaser before the transaction is consummated. While a transaction that is abandoned while a customer is merely browsing through a catalog may be tolerable, abandonment when the customer is just a few clicks away from a purchase is highly undesirable. However, existing Internet transport mechanisms and systems do not allow the e-commerce site owner any ability to distinguish between the "just browsing" and the "about-to-buy" customers. In fact, the vagaries of the Internet may lead to the casual browser receiving a higher quality of service while the about to buy customer becomes frustrated and abandons the transaction.

Attempts have been made to cache web content at various cache servers distributed across the Internet. Each cache server has a an explicit static IP address so as to enable the Internet domain name system to be used to locate cache servers. An HTTP request for a static element such as an image, file or web page is handled by redirecting the client making the request to a domain name corresponding to one of the distributed caches. The client then generates requests directed at the selected cache server. These cache solutions do not affect the manner in which a connection is made between the client and the origin web server and so are only partial solutions. Further, any content that is not or cannot be cached, such as dynamically generated content, must be obtained from the origin web server in a conventional way.

In a similar manner, web sites can be replicated or mirrored at various locations throughout the Internet. Mirror sites exist in a different domain than the origin site and so a user must be made aware of the mirror's domain in order to use the mirror site. Because the user must take explicit actions to access a mirror site, they are harder to use. Also, a user is often guessing at which mirror site will offer the best performance. A need exists for a system and method that enables redirection to any of an arbitrary set of front end computers in a communication system.

SUMMARY OF THE INVENTION

Briefly stated, the present invention involves a system and method for providing network resources from an origin server to a client. A set of intermediary servers is topologically dispersed throughout a network. An enhanced communication channel is provided between the set of intermediary servers and the origin server. A redirector receives address resolution requests for the origin server, selects one of the intermediary servers in response to the request, and provides a network address of the selected intermediary servers to an entity generating the address resolution request.

DETAILED DESCRIPTION OF THE PREFERRED EMBODIMENTS

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary, the present invention is applicable to significantly larger, more complex network environments, including wireless network environments, as well as small network environments such as conventional LAN systems.

The present invention involves a redirector system that functions to redirect web browser software that is "visiting" a particular web site to an appropriate front-end computer or intermediate computer for that site. The redirector mechanism is intended to be highly fault-tolerant, capable of handling significant numbers of redirection requests with near-zero downtime. The redirector represents a modified form of DNS (Domain Name Server). When a request is received to provide the IP address for a given domain name, redirector 309 instead provides the IP address of the best available front-end server 201. In contrast, conventional redirection sends a redirected domain name to the web browser, which in turn determines the redirected IP address using the conventional DNS. In accordance with the present invention, the browser has no knowledge that it has been redirected, and is a passive participant in the redirection process.

One feature of the present invention is that the front-end servers are in separate IP address domains from the originating web server. A redirection mechanism is enabled to select from an available pool of front-end servers and direct client request packets from the originating web server to a selected front-end server. Preferably, the front-end server establishes and maintains an enhanced communication channel with the originating web server. By enhanced it is meant that the enhanced channel offers improved quality of service, lower latency, prioritization services, higher security transport, or other features and services that improve upon the basic transport mechanisms (such as TCP) defined for Internet data transport.

For purposes of this document, a web server is a computer running server software coupled to the World Wide Web (i.e., "the web") that delivers or serves web pages. The web server has a unique IP address and accepts connections in order to service requests by sending back responses. A web server differs from a proxy server or a gateway server in that a web server has resident a set of resources (i.e., software programs, data storage capacity, and/or hardware) that enable it to execute programs to provide an extensible range of functionality such as generating web pages, accessing remote network resources, analyzing contents of packets, reformatting request/response traffic and the like using the resident resources. In contrast, a proxy simply forwards request/response traffic on behalf of a client to resources that reside elsewhere, or obtains resources from a local cache if implemented. A web server in accordance with the present invention may reference external resources. Commercially available web server software includes Microsoft Internet Information Server (IIS), Netscape Netsite, Apache, among others. Alternatively, a web site may be implemented with custom or semi-custom software that supports HTTP traffic.

Figure 1:
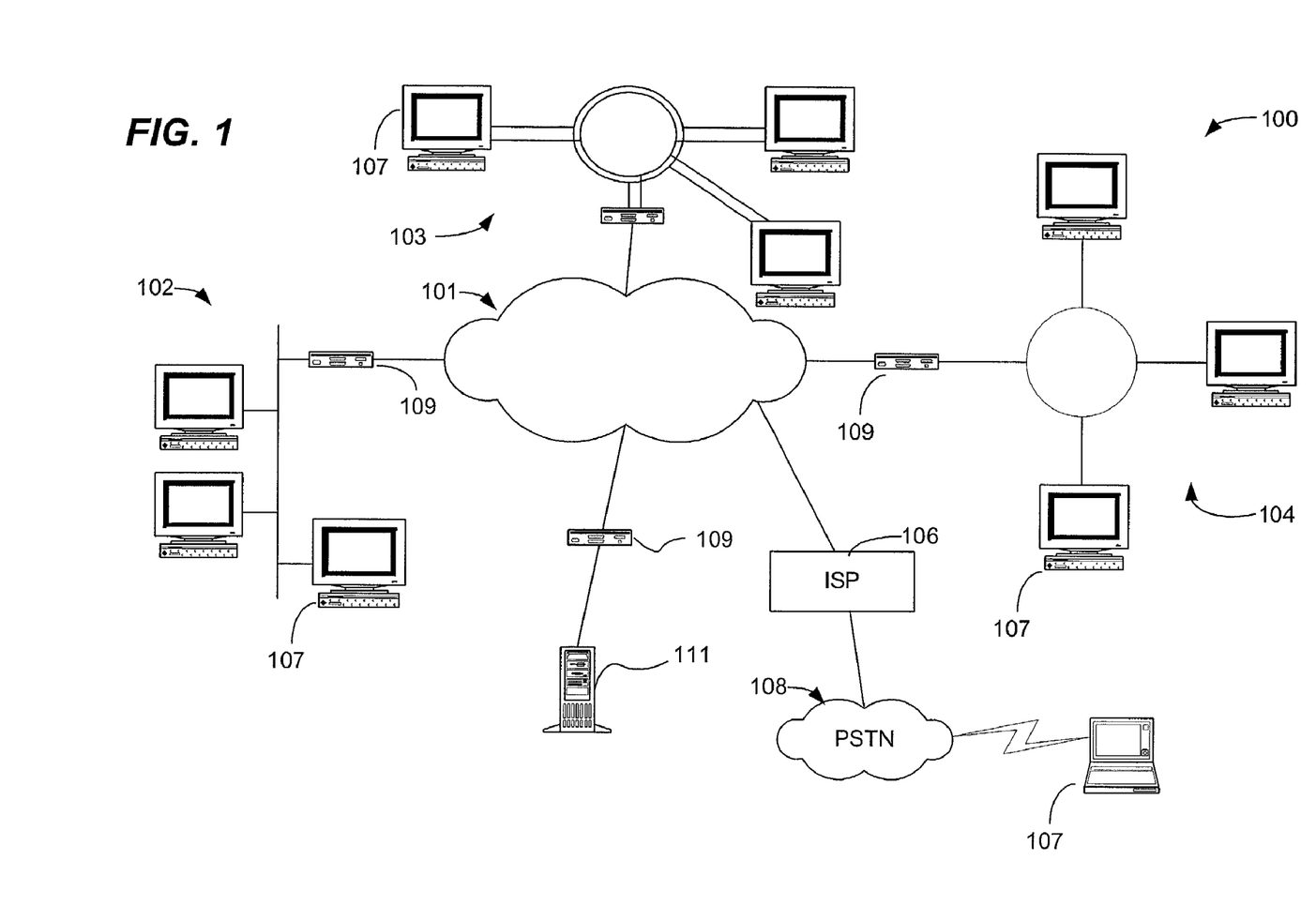
FIG. 1 illustrates a general distributed computing environment in which the present invention is implemented.

FIG. 1 shows an exemplary computing environment 100 in which the present invention may be implemented. Environment 100 includes a plurality of local networks such as Ethernet network 102, FDDI network 103 and Token ring network 104. Essentially, a number of computing devices and groups of devices are interconnected through a network 101. For example, local networks 102, 103 and 104 are each coupled to network 101 through routers 109. LANs 102, 103 and 104 may be implemented using any available topology and may implement one or more server technologies including, for example a UNIX, Novell, or Windows NT networks, including client/server and peer-to-peer type networking. Each network will include distributed storage implemented in each device and typically includes some mass storage device coupled to or managed by a server computer. Network 101 comprises, for example, a public network, such as the Internet, or another network mechanism, such as a fibre channel fabric or conventional WAN technologies.

Local networks 102, 103 and 104 include one or more network appliances 107. One or more network appliances 107 may be configured as an application and/or file server. Each local network 102, 103 and 104 may include a number of shared devices (not shown) such as printers, file servers, mass storage and the like. Similarly, devices 111 may be shared through network 101 to provide application and file services, directory services, printing, storage, and the like. Routers 109 which exist throughout network 101 as well as at the edge of network 101 as shown in FIG. 1, provide a physical connection between the various devices through network 101. Routers 109 may implement desired access and security protocols to manage access through network 101.

Network appliances 107 may also couple to network 101 through public switched telephone network (PSTN) 108 using copper or wireless connection technology. In a typical environment, an Internet service provider 106 supports a connection to network 101 as well as PSTN 108 connections to network appliances 107.

Network appliances 107 may be implemented as any kind of network appliance having sufficient computational function to execute software needed to establish and use a connection to network 101. Network appliances 107 may comprise workstation and personal computer hardware executing commercial operating systems such as Unix variants, Micrsosoft Windows, Macintosh OS, and the like. At the same time, some appliances 107 comprise portable or handheld devices such as personal digital assistants and cell phones executing operating system software such as PalmOS, WindowsCE, EPOC OS and the like. Moreover, the present invention is readily extended to network devices such as office equipment, vehicles, and personal communicators that occasionally connect through network 101.

Each of the devices shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm (not shown) that provides mass storage capacity beyond what an individual device can efficiently use and manage. Selected components of the present invention may be stored in or implemented in shared mass storage.

Figure 2:
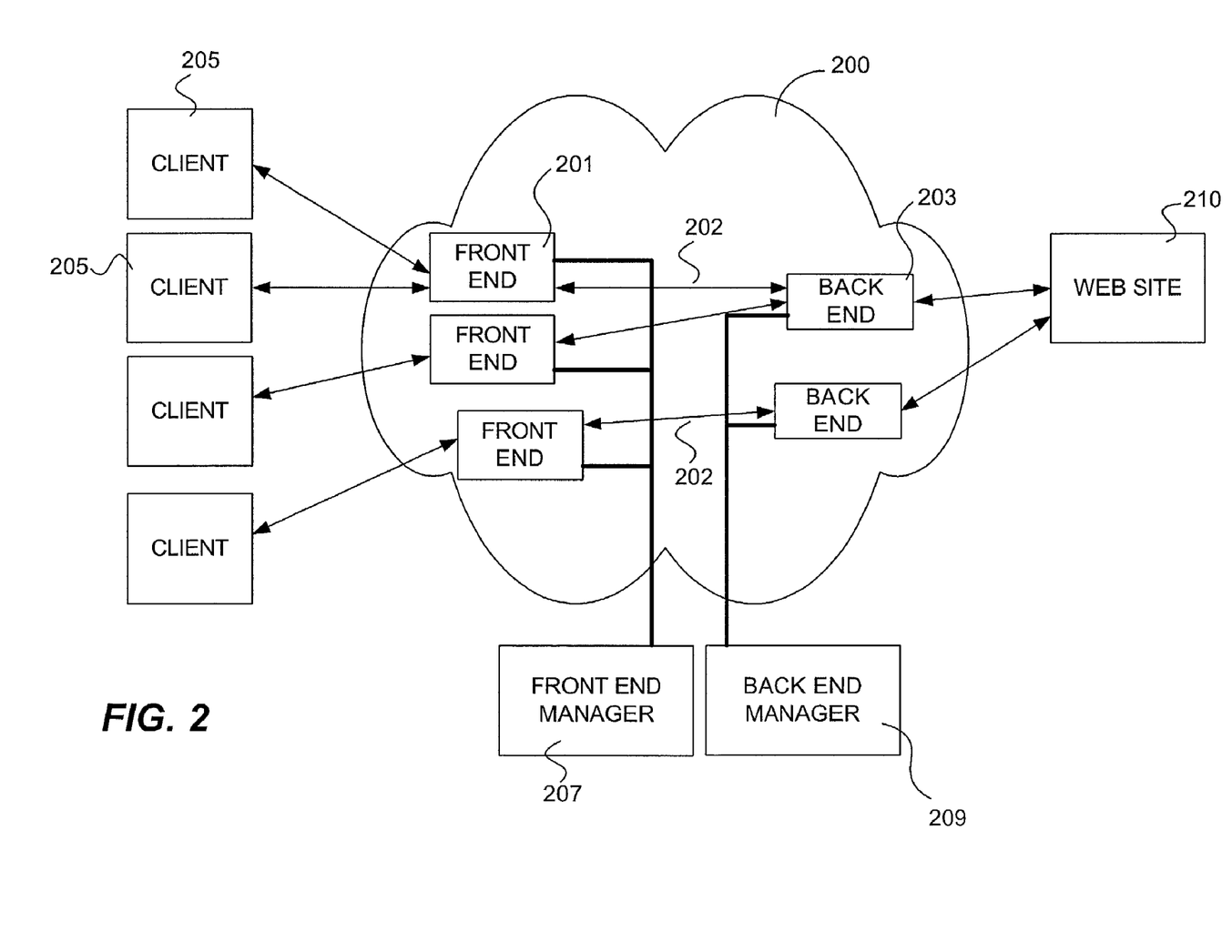
FIG. 2 shows in block-diagram form significant components of a system in accordance with the present invention.

The present invention operates in a manner akin to a private network 200 implemented within the Internet infrastructure. Private network 200 expedites and prioritizes communications between a client 205 and a web site 210. In the specific examples herein client 205 comprises a network-enabled graphical user interface such as a World Wide Web browser. However, the present invention is readily extended to client software other than conventional World Wide Web browser software. Any client application that can access a standard or proprietary user level protocol for network access is a suitable equivalent. Examples include client applications for file transfer protocol (FTP) services, voice over Internet protocol (VOIP) services, network news protocol (NNTP) services, multi-purpose internet mail extensions (MIME) services, post office protocol (POP) services, simple mail transfer protocol (SMTP) services, as well as Telnet services. In addition to network protocols, the client application may access a network application such as a database management system (DBMS) in which case the client application generates query language (e.g., structured query language or "SQL") messages. In wireless appliances, a client application may communicate via a wireless application protocol (WAP) or the like.

For convenience, the term "web site" is used interchangeably with "web server" in the description herein, although it should be understood that a web site comprises a collection of content, programs and processes implemented on one or more web servers. A web site is owned by the content provider such as an e-commerce vendor, whereas a web server refers to set of programs running on one or more machines coupled to an Internet node. The web site 210 may be hosted on the site owner's own web server, or hosted on a web server owned by a third party. A web hosting center is an entity that implements one or more web sites on one or more web servers using shared hardware and software resources across the multiple web sites. In a typical web infrastructure, there are many web browsers, each of which has a TCP connection to the web server in which a particular web site is implemented. The present invention adds two components to the infrastructure: a front-end server 201 and back-end 203. Front-end 201 and back-end 203 are coupled by a managed data communication link 202 that forms, in essence, a private network.

Front-end server 201 serves as an access point for client-side communications. Front-end server 201 implements a gateway that functions as a proxy for the web server(s) implementing web site 210 (i.e., from the perspective of client 205, front-end server 201 appears to be the web site 210). Front-end server 201 comprises, for example, a computer that sits "close" to clients 205. By "close", it is meant that the average latency associated with a connection between a client 205 and a front-end server 201 is less than the average latency associated with a connection between a client 205 and a web site 210. Desirably, front-end servers have as fast a connection as possible to the clients 205. For example, the fastest available connection may be implemented in point of presence (POP) of an Internet service provider (ISP) 106 used by a particular client 205. However, the placement of the front-end servers 201 can limit the number of browsers that can use them. Because of this, in some applications it is more practical to place one front-end server computer in such a way that several POPs can connect to it. Greater distance between front-end server 201 and clients 205 may be desirable in some applications as this distance will allow for selection amongst a greater number front-end servers 201 and thereby provide significantly different routes to a particular back-end server 203. This may offer benefits when particular routes and/or front-end servers become congested or otherwise unavailable.

Transport mechanism 202 is implemented by cooperative actions of the front-end server 201 and back-end server 203. Back-end server 203 processes and directs data communication to and from web site 210. Transport mechanism 202 communicates data packets using a proprietary protocol over the public Internet infrastructure in the particular example. Hence, the present invention does not require heavy infrastructure investments and automatically benefits from improvements implemented in the general purpose network 101. Unlike the general purpose Internet, front-end server 201 and back-end server 203 are programmably assigned to serve accesses to a particular web site 210 at any given time.

It is contemplated that any number of front-end server and back-end server mechanisms may be implemented cooperatively to support the desired level of service required by the web site owner. The present invention implements a many-to-many mapping of front-end servers to back-end servers. Because the front-end server to backend server mappings can by dynamically changed, a fixed hardware infrastructure can be logically reconfigured to map more or fewer front-end servers to more or fewer backends and web sites or servers as needed.

Front-end server 201 together with back-end server 203 function to reduce traffic across a transport morphing protocol™ (TMP™) link 202 and to improve response time for selected browsers. Transport morphing protocol and TMP are trademarks or registered trademarks of Circadence Corporation in the United States and other countries. Traffic across the TMP link 202 is reduced by compressing data and serving browser requests from cache for fast retrieval. Also, the blending of request datagrams results in fewer request: acknowledge pairs across the TMP link 202 as compared to the number required to send the packets individually between front-end server 201 and back-end server 203. This action reduces the overhead associated with transporting a given amount of data, although conventional request:acknowledge traffic is still performed on the links coupling the front-end server 201 to client 205 and back-end server 203 to a web server. Moreover, resend traffic is significantly reduced further reducing the traffic. Response time is further improved for select privileged users and for specially marked resources by determining the priority for each HTTP transmission.

In one embodiment, front-end server 201 and back-end server 203 are closely coupled to the Internet backbone. This means they have high bandwidth connections, can expect fewer hops, and have more predictable packet transit time than could be expected from a general-purpose connection. Although it is preferable to have low latency connections between front-end servers 201 and back-end servers 203, a particular strength of the present invention is its ability to deal with latency by enabling efficient transport and traffic prioritization. Hence, in other embodiments front-end server 201 and/or back-end server 203 may be located farther from the Internet backbone and closer to clients 205 and/or web servers 210. Such an implementation reduces the number of hops required to reach a front-end server 201 while increasing the number of hops within the TMP link 202 thereby yielding control over more of the transport path to the management mechanisms of the present invention.

Clients 205 no longer conduct all data transactions directly with the web server 210. Instead, clients 205 conduct some and preferably a majority of transactions with front-end servers 201, which simulate the functions of web server 210. Client data is then sent, using TMP link 202, to the back-end server 203 and then to the web server 210. Running multiple clients 205 over one large connection provides several advantages:

Since all client data is mixed, each client can be assigned a priority. Higher priority clients, or clients requesting higher priority data, can be given preferential access to network resources so they receive access to the channel sooner while ensuring low-priority clients receive sufficient service to meet their needs.

The large connection between a front-end server 201 and back-end server 203 can be permanently maintained, shortening the many TCP/IP connection sequences normally required for many clients connecting and disconnecting.

Using a proprietary protocol allows the use of more effective techniques to improve data throughput and makes better use of existing bandwidth during periods when the network is congested.

A particular advantage of the architecture shown in FIG. 2 is that it is readily scaled. Any number of client machines 205 may be supported. In a similar manner, a web site owner may choose to implement a site using multiple web servers 210 that are co-located or distributed throughout network 101. To avoid congestion, additional front-end servers 201 may be implemented or assigned to particular web sites. Each front-end server 201 is dynamically re-configurable by updating address parameters to serve particular web sites. Client traffic is dynamically directed to available front-end servers 201 to provide load balancing. Hence, when quality of service drops because of a large number of client accesses, an additional front-end server 201 can be assigned to the web site and subsequent client requests directed to the newly assigned front-end server 201 to distribute traffic across a broader base.

In the particular examples, this is implemented by a front-end manager component 207 that communicates with multiple front-end servers 201 to provide administrative and configuration information to front-end servers 201. Each front-end server 201 includes data structures for storing the configuration information, including information identifying the IP addresses of web servers 210 to which they are currently assigned. Other administrative and configuration information stored in front-end server 201 may include information for prioritizing data from and to particular clients, quality of service information, and the like.

Similarly, additional back-end servers 203 can be assigned to a web site to handle increased traffic. Backend manager component 209 couples to one or more back-end servers 203 to provide centralized administration and configuration service. Back-end servers 203 include data structures to hold current configuration state, quality of service information and the like. In the particular examples front-end manager 207 and back-end manager 209 serve multiple web sites 210 and so are able to manipulate the number of front-end servers and back-end servers assigned to each web site 210 by updating this configuration information. When the congestion for the site subsides, the front-end server 201 and back-end server 203 can be reassigned to other, busier web sites. These and similar modifications are equivalent to the specific examples illustrated herein.

In the case of web-based environments, front-end server 201 is implemented using custom or off-the-shelf web server software. Front-end server 201 is readily extended to support other, non-web-based protocols, however, and may support multiple protocols for varieties of client traffic. Front-end server 201 processes the data traffic it receives, regardless of the protocol of that traffic, to a form suitable for transport by TMP 202 to a back-end server 203. Hence, most of the functionality implemented by front-end server 201 is independent of the protocol or format of the data received from a client 205. Hence, although the discussion of the exemplary embodiments herein relates primarily to front-end server 201 implemented as a web server, it should be noted that, unless specified to the contrary, web-based traffic management and protocols are merely examples and not a limitation of the present invention.

As shown in FIG. 2, in accordance with the present invention a web site is implemented using an originating web server 210 operating cooperatively with the web server of front-end server 201. More generally, any network service (e.g., FTP, VoIP, NNTP, MIME, SMTP, Telnet, DBMS) can be implemented using a combination of an originating server working cooperatively with a front-end server 201 configured to provide a suitable interface (e.g., FTP VoIP, NNTP, MIME, SMTP, Telnet, DBMS, WAP) for the desired service. In contrast to a simple front-end cache or proxy software, implementing a server in front-end server 201 enables portions of the web site (or other network service) to actually be implemented in and served from both locations. The actual web pages or service being delivered comprises a composite of the portions generated at each server. Significantly, however, the web server in front-end server 201 is close to the browser in a client 205 whereas the originating web server is close to all resources available at the web hosting center at which web site 210 is implemented. In essence the web site 210 is implemented by a tiered set of web servers comprising a front-end server 201 standing in front of an originating web server.

This difference enables the web site or other network service to be implemented so as to take advantage of the unique topological position each entity has with respect to the client 205. By way of a particular example, assume an environment in which the front-end server 201 is located at the location of an ISP used by a particular set of clients 205. In such an environment, clients 205 can access the front-end server 205 without actually traversing the network 101.

Figure 3:
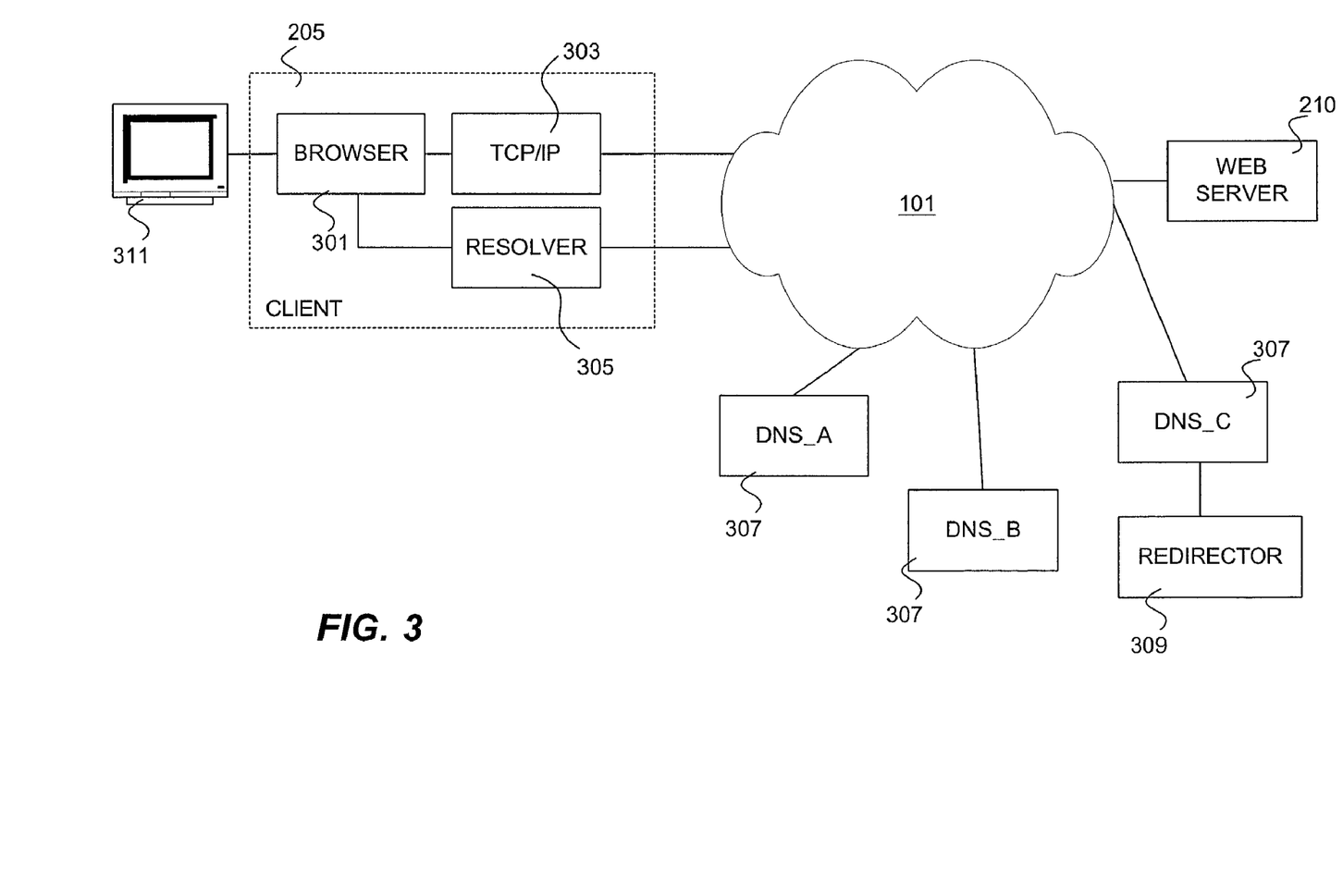
FIG. 3 shows a domain name system used in an implementation of the present invention.

In order for a client 205 to obtain service from a front-end server 201, it must first be directed to a front-end server 201 that can provide the desired service. Preferably, client 205 does not need to be aware of the location of front-end server 201, and initiates all transactions as if it were contacting the originating server 210. FIG. 3 illustrates a domain name server (DNS) redirection mechanism that illustrates how a client 205 is connected to a front-end server 201. The DNS systems is defined in a variety of Internet Engineering Task Force (IETF) documents such as RFC0883, RFC 1034 and RFC 1035 which are incorporated by reference herein. In a typical environment, a client 205 executes a browser 301, TCP/IP stack 303, and a resolver 305. For reasons of performance and packaging, browser 301, TCP/IP stack 303 and resolver 305 are often grouped together as routines within a single software product.

Browser 301 functions as a graphical user interface to implement user input/output (I/O) through monitor 311 and associated keyboard, mouse, or other user input device (not shown). Browser 301 is usually used as an interface for web-based applications, but may also be used as an interface for other applications such as email and network news, as well as special-purpose applications such as database access, telephony, and the like. Alternatively, a special-purpose user interface may be substituted for the more general purpose browser 301 to handle a particular application.

TCP/IP stack 303 communicates with browser 301 to convert data between formats suitable for browser 301 and IP format suitable for Internet traffic. TCP/IP stack also implements a TCP protocol that manages transmission of packets between client 205 and an Internet service provider (ISP) or equivalent access point. IP protocol requires that each data packet include, among other things, an IP address identifying a destination node. In current implementations the IP address comprises a 32-bit value that identifies a particular Internet node. Non-IP networks have similar node addressing mechanisms. To provide a more user-friendly addressing system, the Internet implements a system of domain name servers that map alpha-numeric domain names to specific IP addresses. This system enables a name space that is more consistent reference between nodes on the Internet and avoids the need for users to know network identifiers, addresses, routes and similar information in order to make a connection.

The domain name service is implemented as a distributed database managed by domain name servers (DNSs) 307 such as DNS_A, DNS_B and DNS_C shown in FIG. 3. Each DNS relies on <domain name:IP> address mapping data stored in master files scattered through the hosts that use the domain system. These master files are updated by local system administrators. Master files typically comprise text files that are read by a local name server, and hence become available through the name servers 307 to users of the domain system.

The user programs (e.g., clients 205) access name servers through standard programs such as resolver 305. Resolver 305 includes an address of a DNS 307 that serves as a primary name server. When presented with a reference to a domain name (e.g., http://www.circadence.com), resolver 305 sends a request to the primary DNS (e.g., DNS_A in FIG. 3). The primary DNS 307 returns either the IP address mapped to that domain name, a reference to another DNS 307 which has the mapping information (e.g., DNS_B in FIG. 3), or a partial IP address together with a reference to another DNS that has more IP address information. Any number of DNS-to-DNS references may be required to completely determine the IP address mapping.

In this manner, the resolver 305 becomes aware of the IP address mapping which is supplied to TCP/IP component 303. Client 205 may cache the IP address mapping for future use. TCP/IP component 303 uses the mapping to supply the correct IP address in packets directed to a particular domain name so that reference to the DNS system need only occur once.

In accordance with the present invention, at least one DNS server 307 is owned and controlled by system components of the present invention. When a user accesses a network resource (e.g., a web site), browser 301 contacts the public DNS system to resolve the requested domain name into its related IP address in a conventional manner. In a first embodiment, the public DNS performs a conventional DNS resolution directing the browser to an originating server 210 and server 210 performs a redirection of the browser to the system owned DNS server (i.e., DNC_C in FIG. 3). In a second embodiment, domain:address mappings within the DNS system are modified such that resolution of the of the originating server's domain automatically return the address of the system-owned DNS server (DNS_C). Once a browser is redirected to the system-owned DNS server, it begins a process of further redirecting the browser 301 to the best available front-end server 201.

Unlike a conventional DNS server, however, the system-owned DNS_C in FIG. 3 receives domain:address mapping information from a redirector component 309. Redirector 309 is in communication with front-end manager 207 and back-end manager 209 to obtain information on current front-end and back-end assignments to a particular server 210. A conventional DNS is intended to be updated infrequently by reference to its associated master file. In contrast, the master file associated with DNS_C is dynamically updated by redirector 309 to reflect current assignment of front-end server 201 and back-end server 203. In operation, a reference to web server 210 (e.g., http://www.circadence.com) may result in an IP address returned from DNS_C that points to any selected front-end server 201 that is currently assigned to web site 210. Likewise, web site 210 can identify a currently assigned back-end server 203 by direct or indirect reference to DNS_C.

Front-end server 201 typically receives information directly from front-end server manager 207 about the address of currently assigned back-end servers 203. Similarly, back-end server 203 is aware of the address of a front-end server 201 associated with each data packet. Hence, reference to the domain system is not required to map a front-end server 201 to its appropriate back-end server 203.

Figure 6:
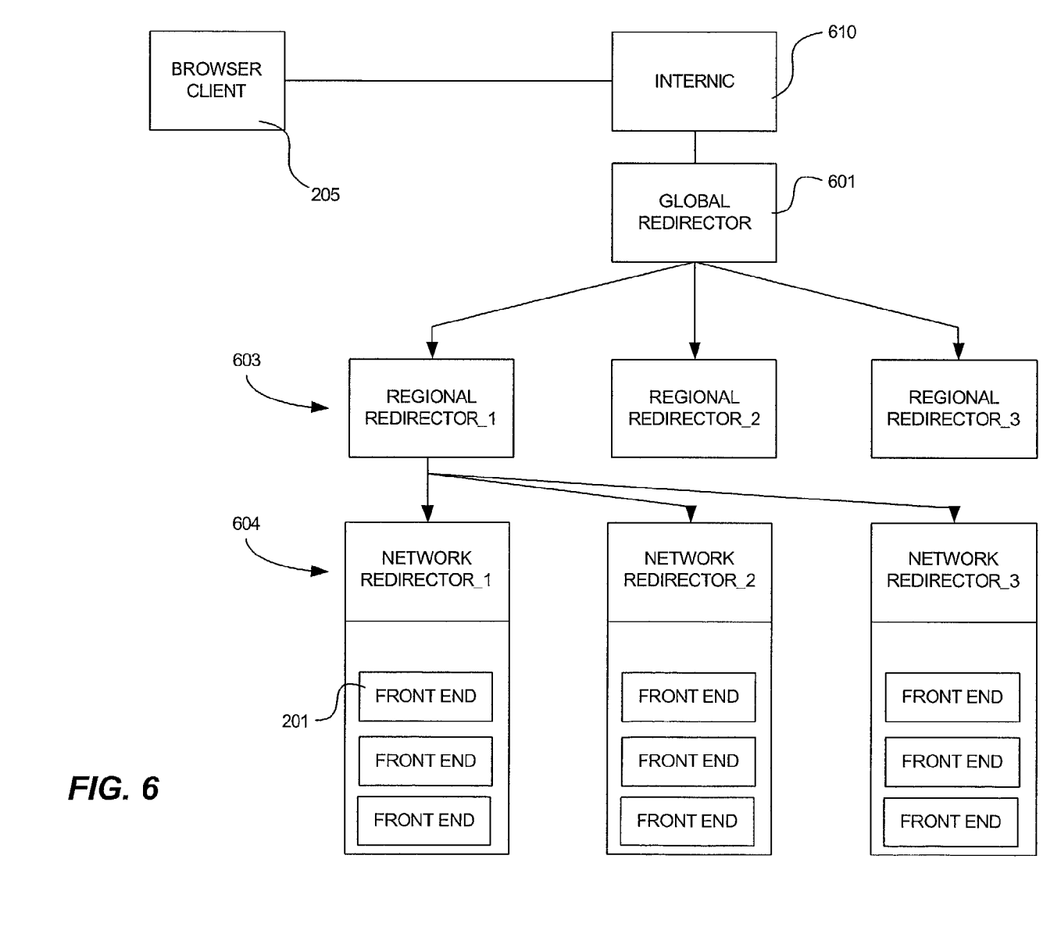
FIG. 6 shows a functional block diagram of a redirection mechanism in accordance with the present invention.

FIG. 6 shows an exemplary implementation of redirector 309 in accordance with the present invention. Redirector 309 is implemented as a multi-level set of redirector servers that cooperate to determine an IP address for a particular front-end server 201 out of a pool of otherwise arbitrary or generic front-end servers 201. When a global redirector server 309 receives a request for domain name resolution, it estimates the global region from which the request came using knowledge about IP address space allocated to particular global region. Third-party services (such as NetGeo) are available that provide such IP address "maps". The user will be redirected to a selected regional redirector server 603 which serves that region. The term "region" refers to portion of the Internet, which could be associated with a part of a country (e.g. southern United States), a country (e.g. Japan), or an entire geographic area (e.g. Western Europe). Such a determination is based on the Internet topology, not the global population.

Once the user has been redirected to regional redirector server 603 in their home region, regional redirector server 603 takes over the process of finding the single best gateway front-end server 201 for the user. Regional redirector 603 identifies a network where the user is located. The "network" in which the user is located refers to a set of one or more front-end servers 201 connected to the same network redirector 604. On any given "network", for any given back-end server 203 (shown in FIG. 2), there must be at least one front-end server 201 connected to that back-end server 203. It is possible that regional redirector 603 might miscalculate the user's location and redirects that user to the wrong network redirector 604. In that situation, the selected network redirector 604 will not reject the user, but will do its best to calculate and return the address of its best available front-end server 201.

In the preferred implementations, each front-end server 201 supports a communication channel with each back-end server 203. Hence, there exist a large number of alternative channels that may be selected to provide suitable service for a given connection. The best available front-end server 201 is determined based on estimates and actual measurements of quality of service that can be provided by the various alternative channels.

In accordance with the present invention, network redirector 604 determines a quality of service index or factor for each of a plurality of the available alternative channels. This quality of service index takes into account a variety of component factors such as latency, lost packets, server load (e.g., CPU usage) within the various front-end servers 201 and back-end servers 203, and the like. This index also attempts to account for components that affect the connection between a client 205 and each front-end server 201, although these factors may not be determinable with precision. Based upon the client's IP address, redirector 604 can estimate the geographic or topological distance between each front-end server 201 and estimate the quality of service of the alternate links. For example, it might often be true that a front-end server 201 that is close to client 205 will provide superior service.

The various component factors are combined arithmetically or logically to generate an index. The combination might be a simple addition or multiplication operation, or may involve weighting each of the component factors. Based upon the determined index, a front-end server 201 can be selected from the arbitrary set of available front-end servers 201. The network address (e.g., IP address) for the selected front-end server 201 is communicated to client 205 in response to the domain resolution request issued by client 205. Henceforth, client 205 maintains the association between the requested domain (www.abc.com) and the returned IP address of the selected front-end server 201. From the client's perspective, the server found at the returned IP address is within the address domain of the requested web site 210.

If a regional redirector 603 were to be off-line, the user's request would fail. To avoid this situation, it is desirable that each regional redirector 603 will be served by at least two computers, to be known as primary and secondary. For regions with significant traffic, it may be advisable to deploy not only primary and secondary computers, but tertiary computers as well.

Front-end servers 201 report their status on a regular basis to their network redirector 604. It is possible that a specific front-end server 201 might go down without the network redirector 604 becoming immediately aware. In that situation, a user's request would not fail. Network redirectors 604 will return not one, but two or three IP addresses of different front-end server computers 201. As a result, if one front-end server is down, the user will be automatically connected to another front-end server 201. It is expected that redirector mechanism 309 will usually realize the unavailability of a front-end server 201 in less than one minute, although the time in a particular implementation may be selected to meet the needs of that implementation.

In cases where regional redirector 603 is unable to identify the network that the user belongs to, it will try to find an alternate network closest to that user, and will redirect that users to the network redirector 604 that serves this alternate network. The selected network redirector 604 completes the process of selecting the most suitable front-end server 201 for a user. The redirector makes a decision by considering several factors that may include:

processor load of available front-end servers 201;
    cost of connection in terms of resources and time to configure those resources between the various available front-end servers 201 and the desired back-end server 203;
    estimated topological distance and latency between the client and the available front-end servers 201;
    estimated topological distance and latency between the available front-end servers 201 and the web site;
    estimated cost of connection;
    ability of the various available front-ends 201 to serve the specific web site 210 (i.e. the content and functionality of web site 210 currently housed on front-ends 201.

Finding the absolute best available front-end server 201 may, in some cases, take too long. If this is the case for a given search, the search process could be curtailed in several ways:

If a satisfactory front-end server 201 is found (with a predetermined acceptable suitability value);
    If a timer runs out, in which case the "best yet" front-end server 201 would be used.

Having selected a front-end server 201, the user is connected to the selected front-end server and the job of redirector 309 is complete. In a particular example, front-end servers 201 communicate only with their corresponding network redirector servers 604. As a result, the user will almost always be sent to a front-end server 201 that is topologically close, for example in their home region, even if not the first "best" choice. Communications between the front-end server computers 201 and the redirector 309 are preferably secure and fault-tolerant.

A special case exists for secure communications. When a client sends a packet using secure HTTP, for example, the payload is encrypted in a manner that only the origin server 210 can decrypt. While the origin server could share its decryption keys with front-ends 201, this may reduce the integrity of the keys to an unacceptable degree owing to the wider distribution of the keys. Hence, a front-end 201 will be unable to parse and process secure packets in the same manner as it is able to work with conventional packets.

In many cases, secure communications use a specially designated port on the sending and receiving machines. For example, conventional HTTP traffic uses port 80 whereas secure HTTP (HTTPS) uses port 443. While other ports can be designated, standard-compliant TCP/IP processes will listen for secure communication on port 443 by default. In these cases, when the client sends a communication on the secure port the back-end 203 should deliver the packet on the secure port.

In accordance with an embodiment of the present invention, redirector 309 specifies a secure port (e.g., port 443) of the selected front-end 201 in the IP address returned to a client 205. Further, front-end 201 implements processes that listen to the secure port and handle packets received on the secure port specially. These packets may be blended with non-secure packets over TMP link 202. However, packets received on a secure port, or any other non-standard port, are marked or tagged with the port number on which they should be delivered. This enables a back-end 203 to address the server 210 on the same port that client 205 intended to send the packet.

Each front-end server 201 regularly reports its status to its network redirector server 604. Once a new front-end server 201 comes online, the redirector 309 would immediately become aware of this new front-end server 201, as well as all back-end servers 203 connected to that front-end server. Should a front-end server 201 become unavailable, the redirector 309 will find out quickly, preferably in less than one minute. This small potential downtime can be reduced even further by means of an optional, third layer of DNS servers.

It is important to prevent the network redirector servers from being misled. Communications between redirector 309 and the front-end servers 201 is preferably secure. Secure connections can be ensured in multiple ways:
  encrypting communications between these systems;
  using a fixed list of front-end servers 201 each having a known address and ensuring that redirector 309 or network redirector 604 confirms that all messages it receives are from trusted sources; and
  sending communications between the systems over an out-of-band connection.

The redirection system in accordance with the present invention is usefully understood in contrast with a conventional DNS system. A conventional DNS is intended to be updated infrequently by reference to its associated master file. In contrast, the master file associated with DNS_C is dynamically updated by redirector 309 to reflect current assignment of front-end server 201 and back-end server 203. In operation, a reference to web server 210 (e.g., http://www.abc.com) may result in an IP address returned from redirector 309 that points to a selected front-end server 201.

Front-end server 201 typically receives information directly from front-end manager 207 about the address of currently assigned back-end servers 203. Similarly, back-end server 203 is aware of the address of a front-end server 201 associated with each data packet. Management utilities will be required to administer the redirector system 309. The global, regional and network DNS servers may require separate utilities. The following is an exemplary list of tasks that the management utilities for redirector system 309 may perform:
  Update list of regional redirectors 603 known to global redirector 601;
  Update list of network redirectors 604 known to regional redirector 603;
  Update list of front-end servers 201 known by network redirectors 604;
  Modify subset of criteria used to determine and select best front-end server 201 available; and
  Report current and historical statistics.

Returning now to FIG. 4, principle functional components of an exemplary front-end server 201 are illustrated in greater detail. Primary functions of the front-end server 201 include translating transmission control protocol (TCP) packets from client 205 into TMP packets used in the system in accordance with the present invention. It is contemplated that the various functions described in reference to the specific examples may be implemented using a variety of data structures and programs operating at any location in a distributed network. For example, a front-end server 201 may be operated on a network appliance 107 or server within a particular network 102, 103, or 104 shown in FIG. 1. The present invention is readily adapted to any application where multiple TCP clients are coupling to a centralized TCP resource. Moreover, other transport control protocols may be used, including proprietary transport protocols, so long as the transport protocols supply the functionality of the TCP protocol.

Figure 4:
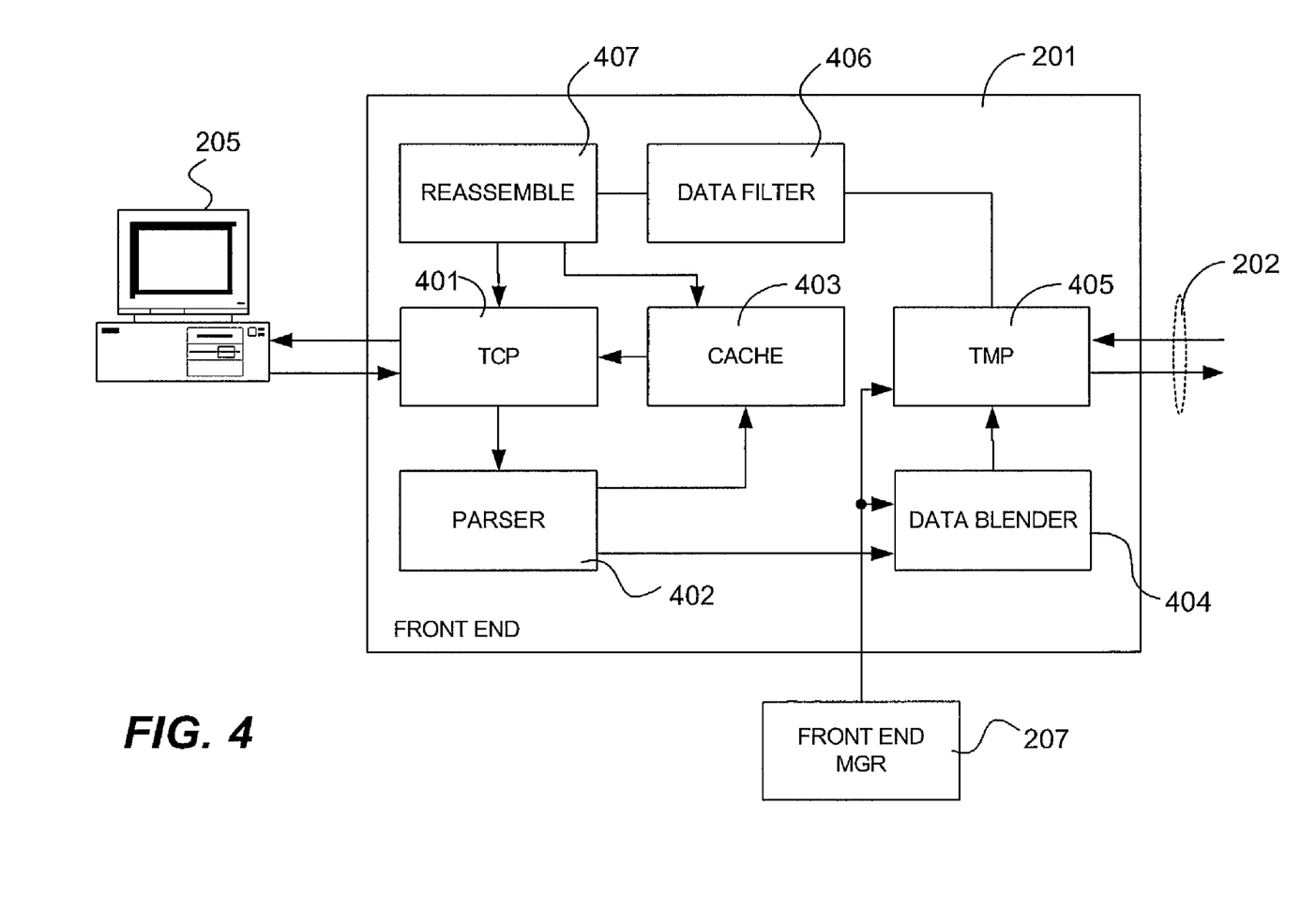
FIG. 4 shows front-end components of FIG. 2 in greater detail.

TCP component 401 includes devices for implementing physical connection layer and Internet protocol (IP) layer functionality. Current IP standards are described in IETF documents RFC0791, RFC0950, RFC0919, RFC0922, RFC792, RFC1112 that are incorporated by reference herein. For ease of description and understanding, these mechanisms are not described in great detail herein.

TCP component 401 communicates TCP packets with one or more clients 205. Received packets are coupled to parser 402 where the Internet protocol (or equivalent) information is extracted. TCP is described in IETF RFC0793 which is incorporated herein by reference. Each TCP packet includes header information that indicates addressing and control variables, and a payload portion that holds the user-level data being transported by the TCP packet. The user-level data in the payload portion typically comprises a user-level network protocol datagram.

Parser 402 analyzes the payload portion of the TCP packet. In the examples herein, HTTP is employed as the user-level protocol because of its widespread use and the advantage that currently available browser software is able to readily use the HTTP protocol. In this case, parser 402 comprises an HTTP parser. More generally, parser 402 can be implemented as any parser-type logic implemented in hardware or software for interpreting the contents of the payload portion. Parser 402 may implement file transfer protocol (FTP), mail protocols such as simple mail transport protocol (SMTP), structured query language (SQL) and the like. Any user-level protocol, including proprietary protocols, may be implemented within the present invention using appropriate modification of parser 402.

To improve performance, front-end server 201 optionally includes a caching mechanism 403. Cache 403 may be implemented as a passive cache that stores frequently and/or recently accessed web pages or as an active cache that stores network resources that are anticipated to be accessed. In non-web applications, cache 403 may be used to store any form of data representing database contents, files, program code, and other information. Upon receipt of a TCP packet, HTTP parser 402 determines if the packet is making a request for data within cache 403. When the request can be satisfied from cache 403, the data is supplied directly without reference to web server 210 (i.e., a cache hit). Cache 403 implements any of a range of management functions for maintaining fresh content. For example, cache 403 may invalidate portions of the cached content after an expiration period specified with the cached data or by web sever 210. Also, cache 403 may proactively update the cache contents even before a request is received for particularly important or frequently used data from web server 210. Cache 403 evicts information using any desired algorithm such as least recently used, least frequently used, first in/first out, or random eviction. When the requested data is not within cache 403, a request is forwarded to web server 210, and the returned data may be stored in cache 403.

Several types of packets will cause parser 404 to forward a request towards web server 201. For example, a request for data that is not within cache 403 (or if optional cache 403 is not implemented) will require a reference to web server 210. Some packets will comprise data that must be supplied to web server 210 (e.g., customer credit information, form data and the like). In these instances, HTTP parser 402 couples to data blender 404.

Optionally, front-end 201 implements security processes, compression processes, encryption processes and the like to condition the received data for improved transport performance and/or provide additional functionality. These processes may be implemented within any of the functional components (e.g., data blender 404) or implemented as separate functional components within front-end 201. Also, parser 402 may implement a prioritization program to identify packets that should be given higher priority service. A prioritization program requires only that parser 402 include a data structure associating particular clients 205 or particular TCP packet types or contents with a prioritization value. Based on the prioritization value, parser 402 may selectively implement such features as caching, encryption, security, compression and the like to improve performance and/or functionality. The prioritization value is provided by the owners of web site 210, for example, and may be dynamically altered, statically set, or updated from time to time to meet the needs of a particular application.

Blender 404 slices and/or coalesces the data portions of the received packets into a more desirable "TMP units" that are sized for transport through the TMP mechanism 202. The data portion of TCP packets may range in size depending on client 205 and any intervening links coupling client 205 to TCP component 401. Moreover, where compression is applied the compressed data will vary in size depending on the compressibility of the data. Data blender 404 receives information from front-end manager 207 that enables selection of a preferable TMP packet size. Alternatively, a fixed TMP packet size can be set that yields desirable performance across TMP mechanism 202. Data blender 404 also marks the TMP units so that they can be re-assembled at the receiving end.

Data blender 404 also serves as a buffer for storing packets from all clients 205 that are associated with front-end server 201. Blender 404 mixes data packets coming into front-end server 201 into a cohesive stream of TMP packets sent to back-end server 203 over TMP link 202. In creating a TMP packet, blender 404 is able to pick and choose amongst the available packets so as to prioritize some packets over others.

In an exemplary implementation, a "TMP connection" comprises a plurality of "TCP connection buffers", logically arranged in multiple "rings". Each TCP socket maintained between the front-end server 201 and a client 205 corresponds to a TCP connection buffer. When a TCP connection buffer is created it is assigned a priority. For purposes of the present invention, any algorithm or criteria may be used to assign a priority. Each priority ring is associated with a number of TCP connection buffer having similar priority. In a specific example, five priority levels are defined corresponding to five priority rings. Each priority ring is characterized by the number of connection buffers it holds (nsockets), the number of connection buffers it holds that have data waiting to be sent (nReady) and the total number of bytes of data in all the connection buffers that it holds (nBytes).

When composing TMP data packets, the blender goes into a loop comprising the steps:

1) Determine the number of bytes available to be sent from each ring (nBytes), and the number of TCP connections that are ready to send (nReady)

2) Determine how many bytes should be sent from each ring. This is based on a weight parameter for each priority. The weight can be thought of as the number of bytes that should be sent at each priority this time through the loop.

3) The nsend value computed in the previous step reflects the weighted proportion that each ring will have in a blended TMP packet, but the values of nSend do not reflect how many bytes need to be selected to actually empty most or all of the data waiting to be sent a single round. To do this, the nSend value is normalized to the ring having the most data waiting (e.g., nbytes=nSendNorm). This involves a calculation of a factor: $S=nBytes/(Weight*nReady)$ for the ring with the greatest nReady. Then, for each ring, calculate nReady*S*Weight to get the normalized value (nSendNorm) for each priority ring.

4) Send sub-packets from the different rings. This is done by taking a sub-packet from the highest priority ring and adding it to a TMP packet, then adding a sub-packet from each of the top two queues, then the top three, and so on.

5) Within each ring, sub-packets are added round robin. When a sub-packet is added from a TCP connection buffer the ring is rotated so the next sub-packet the ring adds will come from a different TCP connection buffer. Each sub-packet can be up to 512 bytes in a particular example. If the connection buffer has less than 512 bytes waiting, the data available is added to the TMP packet.

6) When a full TMP packet (roughly 1.5 kB in a particular example) is built, it is sent. This can have three or more sub packets, depending on their size. The TMP packet will also be sent when there is no more data ready.

Figure 5:
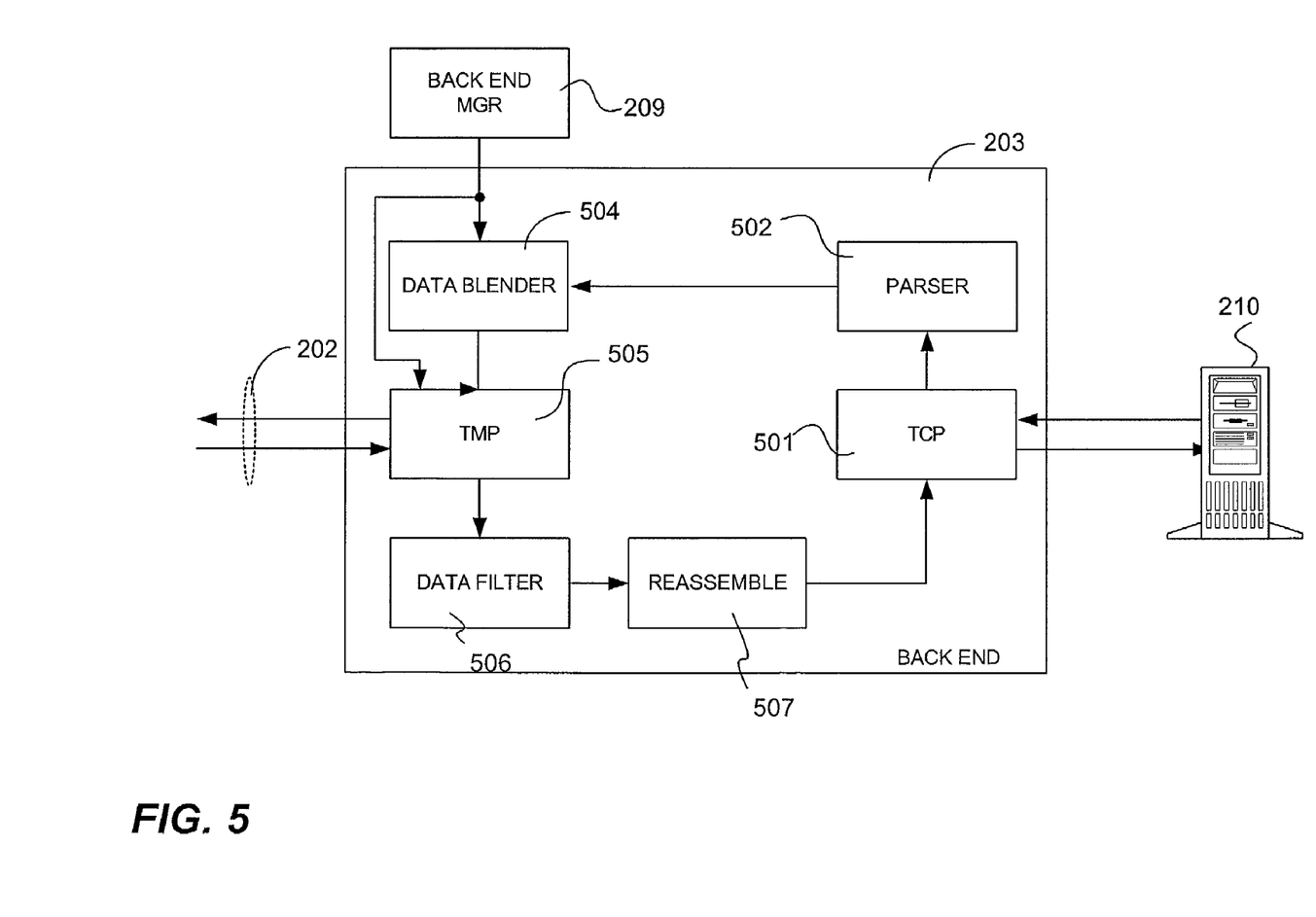
FIG. 5 shows back-end components of FIG. 2 in greater detail.

TMP mechanism 405 implements the TMP protocol in accordance with the present invention. TMP is a TCP-like protocol adapted to improve performance for multiple channels operating over a single connection. Front-end TMP mechanism 405 and corresponding back-end TMP mechanism 505 shown in FIG. 5 are computer processes that implement the end points of TMP link 202. The TMP mechanism in accordance with the present invention creates and maintains a stable connection between two processes for high-speed, reliable, adaptable communication.

TMP is not merely a substitute for the standard TCP environment. TMP is designed to perform particularly well in environments such as the Internet. TMP connections are made less often than TCP connections. Once a TMP connection is made, it remains up unless there is some kind of direct intervention by an administrator or there is some form of connection breaking network error. This reduces overhead associated with setting up, maintaining and tearing down connections normally associated with TCP.

Another feature of TMP is its ability to channel numerous TCP connections through a single TMP pipe 202. The environment in which TMP resides allows multiple TCP connections to occur at one end of the system. These TCP connections are then mapped into a single TMP connection. The TMP connection is then broken down at the other end of the TMP pipe 202 in order to traffic the TCP connections to their appropriate destinations. TMP includes mechanisms to ensure that each TMP connection gets enough of the available bandwidth to accommodate the multiple TCP connections that it is carrying.

Another advantage of TMP as compared to traditional protocols is the amount of information about the quality of the connection that a TMP connection conveys from one end to the other of a TMP pipe 202. As often happens in a network environment, each end has a great deal of information about the characteristics of the connection in one direction, but not the other. By knowing about the connection as a whole, TMP can better take advantage of the available bandwidth.

In contrast with conventional TCP mechanisms, the behavior implemented by TMP mechanism 405 is constantly changing. Because TMP obtains bandwidth to host a variable number of TCP connections and because TMP is responsive information about the variable status of the network, the behavior of TMP is preferably continuously variable. One of the primary functions of TMP is being able to act as a conduit for multiple TCP connections. As such, a single TMP connection cannot behave in the same manner as a single TCP connection. For example, imagine that a TMP connection is carrying 100 TCP connections. At this time, it loses one packet (from any one of the TCP connections) and quickly cuts its window size in half (as specified for TCP). This is a performance reduction on 100 connections instead of just on the one that lost the packet.

Each TCP connection that is passed through the TMP connection must get a fair share of the bandwidth, and should not be easily squeezed out. To allow this to happen, every TMP becomes more aggressive in claiming bandwidth as it accelerates. Like TCP, the bandwidth available to a particular TMP connection is measured by its window size (i.e., the number of outstanding TCP packets that have not yet been acknowledged). Bandwidth is increased by increasing the window size, and relinquished by reducing the window size. Up to protocol specified limits, each time a packet is successfully delivered and acknowledged, the window size is increased until the window size reaches a protocol specified maximum. When a packet is dropped (e.g., no acknowledge received or a resend packet response is received), the bandwidth is decreased by backing off the window size. TMP also ensures that it becomes more and more resistant to backing off (as compared to TCP) with each new TCP connection that it hosts. A TMP should not go down to a window size of less than the number of TCP connections that it is hosting.

In a particular implementation, every time a TCP connection is added to (or removed from) what is being passed through the TMP connection, the TMP connection behavior is altered. It is this adaptation that ensures successful connections using TMP. Through the use of the adaptive algorithms discussed above, TMP is able to adapt the amount of bandwidth that it uses. When a new TCP connection is added to the TMP connection, the TMP connection becomes more aggressive. When a TCP connection is removed from the TMP connection, the TMP connection becomes less aggressive.

TMP pipe 202 provides improved performance in its environment as compared to conventional TCP channels, but it is recognized that TMP pipe 202 resides on the open, shared Internet in the preferred implementations. Hence, TMP must live together with many protocols and share the pipe efficiently in order to allow the other transport mechanisms fair access to the shared communication bandwidth. Since TMP takes only the amount of bandwidth that is appropriate for the number of TCP connections that it is hosting (and since it monitors the connection and controls the number of packets that it puts on the line), TMP will exist cooperatively with TCP traffic. Furthermore, since TMP does a better job at connection monitoring than TCP and TMP is better suited to throughput and bandwidth management than TCP.

Also shown in FIG. 4 are data filter component 406 and HTTP reassemble component 407 that process incoming (with respect to client 205) data. TMP mechanism 405 receives TMP packets from TMP pipe 202 and extracts the TMP data units. Using the appended sequencing information, the extracted data units are reassembled into HTTP data packet information by HTTP reassembler 407. Data filter component 406 may also implement data decompression where appropriate, decryption, and handle caching when the returning data is of a cacheable type.

FIG. 5 illustrates principle functional components of an exemplary back-end 203 in greater detail. Primary functions of the back-end 203 include translating transmission control protocol (TCP) packets from web server 210 into TMP packets as well as translating TMP packets received from a front-end 201 into the one or more corresponding TCP packets to be send to server 210.

TMP unit 505 receives TMP packets from TMP pipe 202 and passes them to HTTP reassemble unit 507 where they are reassembled into the corresponding TCP packets. Data filter 506 may implement other functionality such as decompression, decryption, and the like to meet the needs of a particular application. The reassembled data is forwarded to TCP component 501 for communication with web server 210.

TCP data generated by the web server process are transmitted to TCP component 501 and forwarded to HTTP parse mechanism 502. Parser 502 operates in a manner analogous to parser 402 shown in FIG. 4 to extract the data portion from the received TCP packets, perform optional compression, encryption and the like, and forward those packets to data blender 504. Data blender 504 operates in a manner akin to data blender 404 shown in FIG. 3 to buffer and prioritize packets in a manner that is efficient for TMP transfer. Priority information is received by, for example, back-end manager 209 based upon criteria established by the web site owner. TMP data is streamed into TMP unit 505 for communication on TMP pipe 202.

Figure 7:
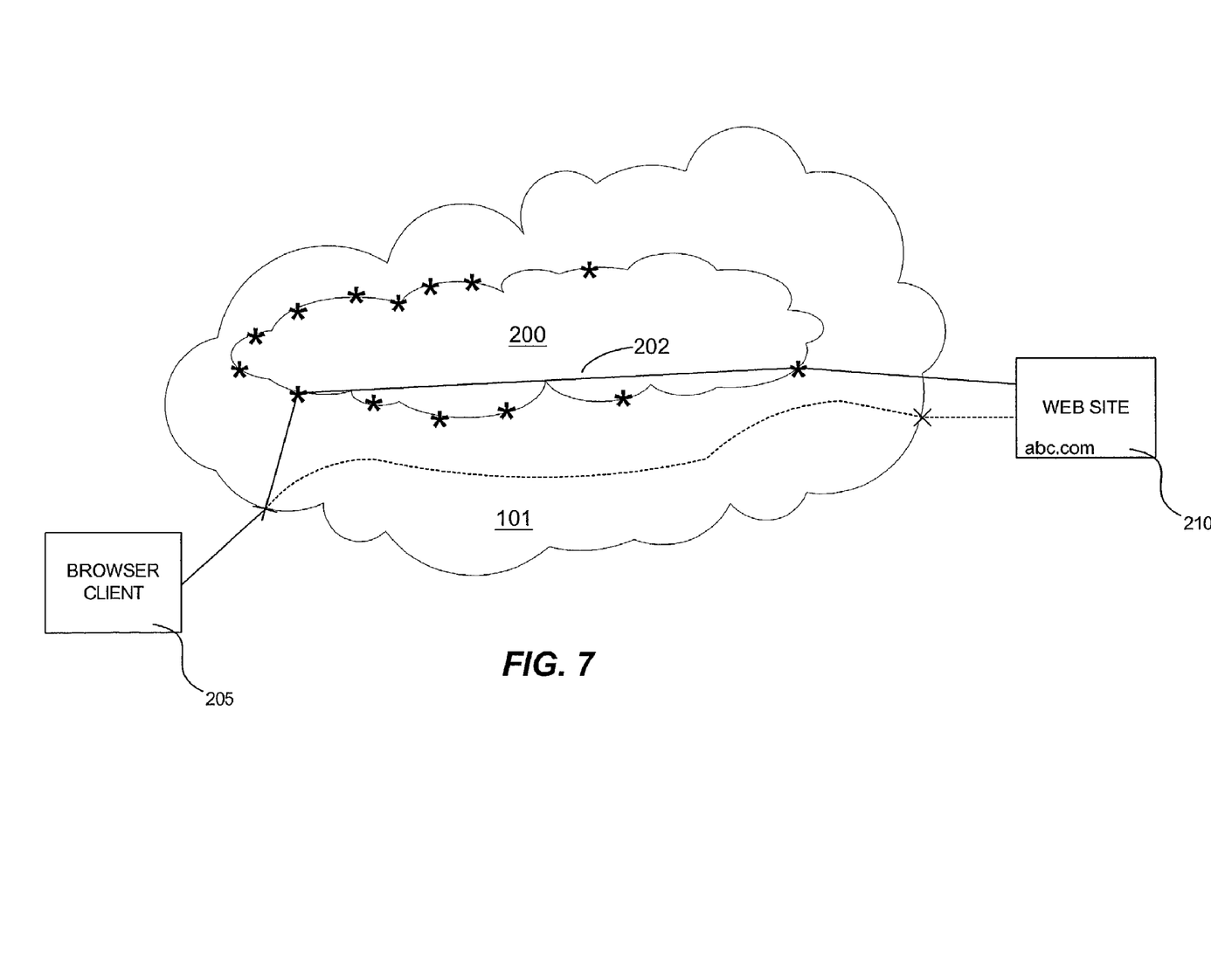
FIG. 7 illustrates a conceptual diagram showing entity relationships maintained by the system in accordance with the present invention.

FIG. 7 illustrates a conceptual diagram showing entity relationships maintained by the system in accordance with the present invention. In FIG. 7, client 205 is an HTTP client of the web server or servers implementing web site 210. Virtual network 200 is defined by the network of front-end servers 201 and back-end servers 203 in accordance with the present invention that are illustrated by stars along the periphery of virtual network 200. There may be many hundreds or thousands of these front-end servers 201 and back-end servers 203 making the reach of virtual network 200 substantially coextensive with Internet 101 itself.

The present invention involves two conceptual redirection activities. First, a client request for the web site at domain "abc.com" must be redirected to virtual network 200. This first level of redirection does not select a particular front-end server 201, but instead involves the redirection to the virtual network 200 which comprises the collection of arbitrary front-end servers 201. For purposes of discussion, virtual network 200 is within a domain "redir.abc.com" although it should be understood that virtual network 200 is shared across every domain that has a web site 210 coupled to a back-end server 203. A second redirection activity involves selecting a particular channel 202 such that all subsequent communication between client 205 and web site 210 is conducted over the selected channel.

One or more back-end servers 203 have a persistent relationship or assignment to web site 210. In contrast, any of the available front-end servers 201 may be dynamically connected to the back-end 203 assigned to a particular site. The first level of redirection can be accomplished in a number of ways. As described hereinbefore, the public DNS administered by InterNIC can be informed that the domain "abc.com" is to be administered by redirector 601 rather than a conventional DNS. This requires a web site owner to turn over control of all or a portion of its domain name to the administrator of redirector 601. It is contemplated that only a portion may be turned over by the owner of abc.com. (e.g., abc.def.com is turned over, but ghi.def.com is retained). The first level of redirection is then handled by the upper level public DNS system as shown in FIG. 6 where InterNic 610 references redirector 601 during the resolution process.

Alternatively, web site 210 can retain control over the domain name "abc.com" and explicitly redirect as desired by responding to the initial (or any subsequent) HTTP request with a reference to "redir.abc.com". The domain "redir.abc.com" refers only to a virtual network 200 and not to a physical machine. However, "redir.abc.com" is registered with Internic 610 to be resolved by redirector 601. In this manner, the administrator of web site 210 can determine at what point a client 205 is redirected into the enhanced communication channels 202 made available by virtual network 200.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, while devices supporting HTTP data traffic are used in the examples, the HTTP devices may be replaced or augmented to support other public and proprietary protocols including FTP, NNTP, SMTP, SQL and the like. In such implementations the front-end server 201 and/or back end 203 are modified to implement the desired protocol. Moreover, front-end server 201 and back-end server 203 may support different protocols such that the front-end server 201 supports, for example, HTTP traffic with a client and the back-end server supports a DBMS protocol such as SQL. Such implementations not only provide the advantages of the present invention, but also enable a client to access a rich set of network resources with minimal client software.

We claim:

1. A system for serving web pages to a requesting software application comprising:
   a web site;
   a plurality of front-end servers, wherein a unique network address is assigned to each front-end server;
   a first channel configured to support request and response communication between the software application and the web site;
   a plurality of second channels configured to support communication between each of the front-end servers and the web site;
   a redirector server operable to select one front-end server from the plurality of front-end servers and generate a response referring the requesting software application to the selected front-end server, wherein the redirector server determines a composite quality factor based on at least partially two or more component factors for the plurality of second channels and selects the selected one front-end server at least partially based upon the relative composite quality factors of the plurality of second channels; and
   mechanisms within the web site for redirecting a request received from the software application on the first channel to the redirector server.

2. The system of claim 1 wherein the web site is located in a first address domain and the plurality of front-end servers are located within a second address domain.

3. The system of claim 1 further comprising:
   mechanisms within at least some of the front-end servers for implementing a portion of the web site, wherein the redirector server selects amongst the plurality of front-end servers based upon a relative ability of the front-end servers to implement the web site without reference to the first address domain.

4. The system of claim 1 wherein the first communication channel comprises an Internet standard communication channel and the second channel comprises an enhanced communication channel linking at least one of the plurality of front-end servers with the web site.

5. The system of claim 1 wherein the redirector server further determines a communication quality factor for the communication channel for at least one front-end and the requesting software application and selects the selected one front-end at least partially based upon the relative communication quality factors of the channels between the plurality of front end servers and the requesting software application.

6. The system of claim 1 wherein the redirector server comprises a multi-tiered set of redirector servers including:
   a global redirector which is registered with a public domain name system as a domain name server for the domain name of the web site;
   a plurality of regional redirectors, wherein each regional redirector is registered with the global redirector as a domain name server for a particular topographical region; and
   a plurality of network redirectors, wherein each network redirector is associated with a subset of front-ends and is registered with each of the regional redirectors as a domain name server for the associated subset of front-ends.

7. The system of claim 6 wherein the global redirector selects amongst the regional redirectors based upon an estimated user location indicated by the network address supplied by the requesting software application.

8. The system of claim 6 wherein the regional redirectors select amongst the plurality of network redirectors based upon an estimated user location indicated by the network address supplied by the requesting software application.

9. The system of claim 6 wherein the network redirectors select amongst the plurality of front-ends at least partially based upon a calculated index comparing the estimated quality of service that can be provided by each of the front-ends in the subset of front-ends associated with the network redirector.

10. The system of claim 6 wherein the network redirectors select amongst the plurality of front-ends at least partially based upon a comparison of content and/or services provided by the front-ends.

11. The system of claim 1 wherein the redirector server generates a response referring the requesting software application to a secure port of the selected front-end server.

12. A method for redirecting a communication between a software application and a network resource over a communication network, the method comprising:

causing a software application to generate a first DNS ("domain name system") request over a first channel within the communication network, the first request specifying a domain name of the network resource;

selecting a second channel within the communication network that supports communication with the network resource;

responding to the DNS request with a network address of a front-end machine that supports the selected second channel;

conducting subsequent communications between the software application and the network resource over the second channel; and causing the network resource to generate a redirect message in response to the first request, the redirect response identifying a redirector server to perform the responding to the DNS request.

13. The method of claim 12 further comprising:

causing the software application to generate a second request directed to the redirector server; and causing the redirector server to generate a message in response to the second request, the message identifying a selected one of a plurality of front-end servers that are configured to implement the second channel.

14. The method of claim 12 wherein the first request is resolved by a public domain name system to identify a network address of a global redirector server that is registered with the public domain name service as a domain name server for the domain name of the network resource.

15. The method of claim 12 wherein the plurality of front-end servers are located within a first address domain different from an address domain in which the network resource is located.

16. The method of claim 12 wherein the act of responding to the DNS request with a network address of a front-end machine that supports the second channel further comprises responding with a secure port address of the front-end machine.

\* \* \* \* \*